US012404721B1

(12) United States Patent
Garg

(10) Patent No.: US 12,404,721 B1
(45) Date of Patent: Sep. 2, 2025

(54) SMART LADDER WITH SAFETY FEATURES TO AVOID ACCIDENTS AND ENSURE SAFETY BEFORE AND DURING USAGE

(71) Applicant: Akshat Garg, San Jose, CA (US)

(72) Inventor: Akshat Garg, San Jose, CA (US)

( * ) Notice: Subject to any disclaimer, the term of this patent is extended or adjusted under 35 U.S.C. 154(b) by 0 days.

(21) Appl. No.: 18/653,752

(22) Filed: May 2, 2024

(51) Int. Cl.
*E06C 7/00* (2006.01)
*E06C 1/22* (2006.01)
*E06C 1/39* (2006.01)
*E06C 7/08* (2006.01)

(52) U.S. Cl.
CPC ................ *E06C 7/003* (2013.01); *E06C 1/22* (2013.01); *E06C 1/39* (2013.01); *E06C 7/08* (2013.01)

(58) Field of Classification Search
CPC ... E06C 7/003; E06C 7/08; E06C 1/22; E06C 1/39; E06C 1/24; E06C 1/30
See application file for complete search history.

(56) References Cited

U.S. PATENT DOCUMENTS

| | | | | | |
|---|---|---|---|---|---|
| 4,766,525 | A * | 8/1988 | Loughlin | E06C 7/003 | 362/802 |
| 5,590,739 | A * | 1/1997 | High | E06C 1/397 | 182/208 |
| 5,740,881 | A * | 4/1998 | Lensak | E06C 7/003 | 33/366.11 |
| 5,853,065 | A * | 12/1998 | Hutson | E06C 7/42 | 182/18 |
| 6,657,547 | B2 * | 12/2003 | Ching-Yao | E06C 7/003 | 182/27 |
| 7,370,725 | B1 * | 5/2008 | Dornfeld | E06C 7/12 | 182/39 |
| 7,772,986 | B2 * | 8/2010 | Olson | G08B 3/10 | 340/691.1 |
| 8,167,087 | B2 * | 5/2012 | Simeonov | E06C 7/003 | 33/366.14 |
| 9,212,038 | B1 * | 12/2015 | Presti | E04G 1/22 | |
| 9,711,028 | B1 * | 7/2017 | Friedman | G08B 21/0461 | |
| 10,260,282 | B1 * | 4/2019 | Bautista | G01L 1/005 | |
| 11,499,370 | B2 * | 11/2022 | Haynes | E06C 7/003 | |
| 2008/0111685 | A1 * | 5/2008 | Olson | G08B 3/10 | 340/568.1 |
| 2010/0031573 | A1 * | 2/2010 | Whiting | E06C 7/003 | 49/31 |
| 2010/0224444 | A1 * | 9/2010 | Simeonov | E06C 7/003 | 340/689 |
| 2011/0148645 | A1 * | 6/2011 | Sarmiento | E06C 1/18 | 340/665 |
| 2014/0299412 | A1 * | 10/2014 | Cordani | A62C 31/24 | 182/51 |
| 2015/0285476 | A1 * | 10/2015 | Bina | E06C 7/003 | 182/129 |
| 2016/0215561 | A1 * | 7/2016 | Austin | E06C 7/14 | |
| 2017/0226800 | A1 * | 8/2017 | Barry | A47C 12/00 | |
| 2019/0017325 | A1 * | 1/2019 | Knickrehm | E06C 7/186 | |
| 2020/0222777 | A1 * | 7/2020 | Zimmerman | A63B 24/0003 | |
| 2020/0347674 | A1 * | 11/2020 | Haynes | E06C 7/42 | |
| 2022/0018190 | A1 * | 1/2022 | Gonzalez | E06C 7/003 | |

(Continued)

*Primary Examiner* — Daniel P Cahn
*Assistant Examiner* — Shiref M Mekhaeil
(74) *Attorney, Agent, or Firm* — Plager Schack LLP; Mark H. Plager; Stephen Hallberg

(57) ABSTRACT

A smart ladder with safety features is disclosed which provides several safety features to avoid accidents and ensure safety before and during usage of the ladder by a person.

8 Claims, 7 Drawing Sheets

(56) References Cited

U.S. PATENT DOCUMENTS

| | | | | |
|---|---|---|---|---|
| 2022/0088425 | A1* | 3/2022 | Miller | A62B 35/04 |
| 2022/0372819 | A1* | 11/2022 | McAuliffe | H01M 50/298 |
| 2023/0013422 | A1* | 1/2023 | Haynes | H04W 4/80 |

* cited by examiner

SMART LADDER WITH SAFETY FEATURES TO AVOID ACCIDENTS AND ENSURE SAFETY BEFORE AND DURING USAGE

BACKGROUND

Embodiments of the invention described in this specification relate generally to ladders, and more particularly, to a smart safety ladder that is intended for use in homes, offices, warehouses, construction sites, fields, and any other environment and which provides several safety features to reduce risk of accident and ensure proper ladder usage.

Ladders are commonly used in homes, offices, warehouses, construction sites, fields, and any of several other environments. Manufacturers of existing types of ladders typically provide instructions for use and recommendations to maintain safety and avoid accidents. While proper usage of a ladder, per the manufacturer's instructions, may reduce risk to a person climbing up or down the ladder, there is still an inherent risk that people ignore the instructions and recommended usage guidelines. Consequently, many people engage in improper usage of their ladder, which clearly increases the possibility of accidents from the ladder falling/toppling over or from the person slipping off the ladder, and other risks, such as adding extra items to the ladder (e.g., paint cans, tools, etc.), and other potential risks which have not been adequately dealt with in the existing types of ladders in the market.

Furthermore, many people use ladders on uneven surfaces, such as the outside ground or along a staircase. Some users try to make improvised adaptations to overcome such uneven surfaces. For example, a person may place books or bricks under one or more of the legs of the ladder to provide a more even plane for the ladder when placed on an otherwise uneven surface. This can prove to be both unsafe and inconvenient. Yet, none of the existing types of ladders support automatically adjustable legs. Looking beyond uneven surfaces, none of the existing ladders provide or support any kind of automation or real-time monitoring to ensure safe usage of the ladder.

Therefore, what is needed is a way to improve the safety profile of a ladder by adding safety features and incorporating real-time monitoring and automation to reduce the risk for accidents and ensure safety during use in any environment.

BRIEF DESCRIPTION

A novel smart safety ladder is disclosed for use in homes, offices, warehouses, construction sites, fields, and any other environment.

In some embodiments, the smart safety ladder provides a plurality of safety features that reduce the risk of accidents and increase safety before and during use of the ladder. In some embodiments, the plurality of safety features comprise (i) adjustable legs that adapt in length to uneven terrain, (ii) a real-time risk communication system and onboard computing device that notifies and alerts users the risk of accident based on sensor data analysis while in use and with non-conforming usage of the ladder, (iii) an emergency alert communication system that informs emergency contacts of the user and/or contacts emergency services (e.g., '911' emergency services) when the ladder falls and the user is on the ladder, and (iv) a top platform leveling system that is configured to identify when a top platform of the ladder is level and at a desired height of the ladder.

In some embodiments, the smart safety ladder incorporates several safety features that reduce the risk of accidents and increase safety before and during usage by a person (or "user"). In some embodiments, the smart safety ladder comprises adjustable-length legs, an onboard computing device, and several sensors configured to detect possible accidents. Examples of the types of scenarios in which the smart safety ladder can foresee possible accidents include, without limitation, improper user practices (while the user is on the ladder) according to the manufacturer's guidelines or other ladder safety guidance (hereinafter referred to individually and collectively as "safe usage guidelines"), improper center of gravity forces attendant to the ladder during use, or tipping or toppling over due to uneven balance or other factors. In this way, the smart safety ladder ensures that the ladder is used according to the safe usage guidelines.

In some embodiments, the smart safety ladder comprises adjustable legs that adapt in length to uneven terrain. In some embodiments, the smart safety ladder is configured to detect uneven surfaces (of the ground or terrain upon which the ladder is placed) and automatically adjust the lengths of the adjustable-length legs of the ladder to ensure that the ladder stands upright and balanced.

In some embodiments, the smart safety ladder comprises a real-time risk communication system and onboard computing device that notifies and alerts users the risk of accident based on sensor data analysis while in use and non-conforming usage of the ladder. In some embodiments, the real-time risk communication system and onboard computing device of the smart safety ladder is configured to alert the user as to the risk when possible accident scenarios are detected, thereby ensuring that the user can avoid such accidents and ensure their physical safety. In this way, the smart safety ladder helps users of the ladder to engage in proper usage, according to the manufacturer's instructions, safety guidelines, and other guidance for proper usage of the ladder.

In some embodiments, the smart safety ladder further comprises an emergency alert communication system that is configured to inform emergency contacts provided by the user or contact emergency services when the smart safety ladder falls during use by the user.

In some embodiments, the smart safety ladder comprises a level-sensing component (referred to as the "top platform leveling system") that is configured to identify when a top platform of the ladder is level and at a desired height of the ladder, regardless of the leg length configuration of the ladder.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
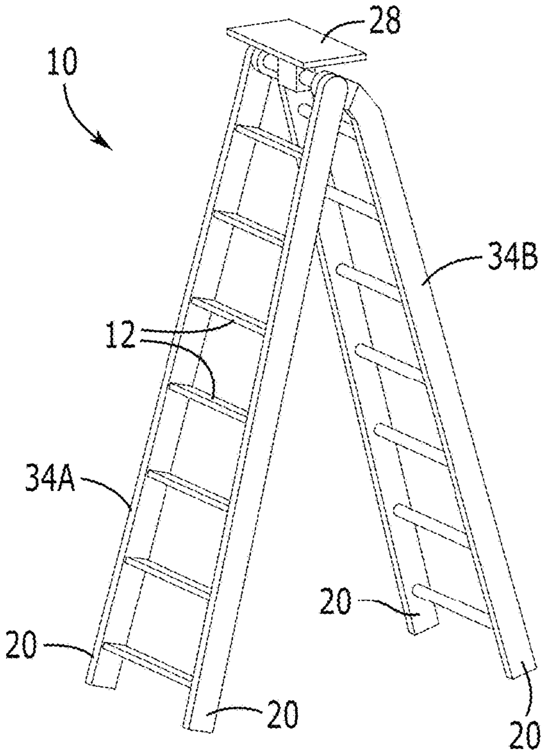
FIG. 1 conceptually illustrates a side perspective view of a smart safety ladder in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification include a novel smart safety ladder for use in homes, offices, warehouses, construction sites, fields, and any other environment.

In some embodiments, the smart safety ladder provides a plurality of safety features that reduce the risk of accidents and increase safety before and during use of the ladder. In some embodiments, the plurality of safety features comprise (i) adjustable legs that adapt in length to uneven terrain, (ii) a real-time risk communication system and onboard computing device that notifies and alerts users the risk of accident based on sensor data analysis while in use and with non-conforming usage of the ladder, (iii) an emergency alert communication system that informs emergency contacts of the user and/or contacts emergency services (e.g., '911' emergency services) when the ladder falls and the user is on the ladder, and (iv) a top platform leveling system that is configured to identify when a top platform of the ladder is level and at a desired height of the ladder.

In some embodiments, the smart safety ladder incorporates several safety features that reduce the risk of accidents and increase safety before and during usage by a person (or "user"). In some embodiments, the smart safety ladder comprises adjustable-length legs, an onboard computing device, and several sensors configured to detect possible accidents. Examples of the types of scenarios in which the smart safety ladder can foresee possible accidents include, without limitation, improper user practices (while the user is on the ladder) according to the manufacturer's guidelines or other ladder safety guidance (hereinafter referred to individually and collectively as "safe usage guidelines"), improper center of gravity forces attendant to the ladder during use, or tipping or toppling over due to uneven balance or other factors. In this way, the smart safety ladder ensures that the ladder is used according to the safe usage guidelines.

In some embodiments, the smart safety ladder comprises adjustable legs that adapt in length to uneven terrain. In some embodiments, the smart safety ladder is configured to detect uneven surfaces (of the ground or terrain upon which the ladder is placed) and automatically adjust the lengths of the adjustable-length legs of the ladder to ensure that the ladder stands upright and balanced.

In some embodiments, the smart safety ladder comprises a real-time risk communication system and onboard computing device that notifies and alerts users the risk of accident based on sensor data analysis while in use and non-conforming usage of the ladder. In some embodiments, the real-time risk communication system and onboard computing device of the smart safety ladder is configured to alert the user as to the risk when possible accident scenarios are detected, thereby ensuring that the user can avoid such accidents and ensure their physical safety. In this way, the smart safety ladder helps users of the ladder to engage in proper usage, according to the manufacturer's instructions, safety guidelines, and other guidance for proper usage of the ladder.

In some embodiments, the smart safety ladder further comprises an emergency alert communication system that is configured to inform emergency contacts provided by the user or contact emergency services when the smart safety ladder falls during use by the user.

In some embodiments, the smart safety ladder comprises a level-sensing component (referred to as the "top platform leveling system") that is configured to identify when a top platform of the ladder is level and at a desired height of the ladder, regardless of the leg length configuration of the ladder.

As stated above, ladders are commonly used in homes, offices, warehouses, construction sites, fields, and any of several other environments. Manufacturers of existing types of ladders typically provide instructions for use and recommendations to maintain safety and avoid accidents. While proper usage of a ladder, per the manufacturer's instructions, may reduce risk to a person climbing up or down the ladder, there is still an inherent risk that people ignore the instructions and recommended usage guidelines. Consequently, many people engage in improper usage of their ladder, which clearly increases the possibility of accidents from the ladder falling/toppling over or from the person slipping off the ladder, and other risks, such as adding extra items to the ladder (e.g., paint cans, tools, etc.), and other potential risks which have not been adequately dealt with in the existing types of ladders in the market. Furthermore, many people use ladders on uneven surfaces, such as the outside ground or along a staircase. Some users try to make improvised adaptations or work-arounds to overcome such uneven surfaces. For example, a person may place books or bricks under one or more of the legs of the ladder to provide a more even plane for the ladder when placed on an otherwise uneven surface. This can prove to be both unsafe and inconvenient. Yet, none of the existing types of ladders support automatically adjustable legs. Looking beyond uneven surfaces, none of the existing ladders provide or support any kind of automation or real-time monitoring to ensure safe usage of the ladder. Embodiments of the invention described in this specification solve such problems by providing individually adjustable legs with automation via motor/actuators for automated setup and smart safety features that warn and alert users in real-time of ladder usage risks.

The embodiments described in this specification differ from and improve upon currently existing options. In particular, existing types of ladders (or "conventional ladders") are all equipped with fixed-length legs. That means there is no way to individually adjust one or more of the legs to ensure a more level placement when positioned on uneven terrain. Even current adjustable height ladders do not provide any ability to individually adjust a single leg at a time. Furthermore, these adjustable height ladders—while providing the ability for the ladder to reach higher or lower points of elevation as needed—need to be manually adjusted. In other words, the existing ladders do not provide any sort of automation. This has always been, and remains to be, an inconvenience to users of the existing ladders. Additionally, none of the existing ladders account for or monitor (in any way) center of gravity or weight distributions, weight restrictions during use, or any other real-time, automatic safety features. In most cases, the only "safety feature" is the "notice of caution" sticker placed on the ladder, which relies entirely upon the user of the ladder to take notice and comply with the safe usage guidelines. As it turns out, many people do not even read or take notice of this. By contrast, the smart safety ladder described in this specification provides "smart" automated safety features and real-time monitoring during usage of the ladder. Specifically, the smart safety ladder provides adjustable-length legs to ensure safety when the ladder is used on uneven surfaces or terrain, motorized automation of leg length adjustments, as needed, continuous real-time center of gravity and weight distribution monitoring and detection of unsafe center of gravity or weight distribution, communication via wireless connectivity to a mobile app which runs on any smartphone computing device of a user, communication with emergency contacts or emergency services when the ladder falls while the user is on the ladder, top platform leveling, weight (or pressure) sensing, and many other features that ensure the user's safety before and during usage of the smart safety ladder in any environment.

In addition, the smart safety ladder is designed to seamlessly incorporate (or embed) several hardware devices and components which lend utility to the smart safety ladder in ways that improve upon conventional ladders. Specifically, the smart safety ladder comprises several sensors including at least weight sensors (pressure sensors), a gyroscope for tilt sensing, a temperature monitor, and other sensors. The smart safety ladder also includes several actuator/motor assemblies that are configured to extend or shorten each individual leg for even distribution of weight and level placement of the ladder on uneven surfaces or terrain. As noted above, the adjustable legs of the smart safety ladder are configured to automatically adapt to the unevenness of the terrain, and further configured to detect/spot softness and hardness of the terrain and otherwise provide utility in achieving a desired ladder height. However, the actual elongation of the legs is powered via the actuator/motor assemblies. Details of the sensors, the adjustable legs, and the actuator/motor assemblies of the smart safety ladder are described further below, by reference to FIGS. 3-5.

Additionally, the smart safety ladder comprises an embedded onboard computing device with a computer program/software application (hereinafter referred to as the "smart safety software") that implements one or more safety detection and alert processes. The smart safety software is configured to provide user safety while a user before and during usage of the ladder. In one aspect, the smart safety software provides a setup routine to automate setup of the ladder, no matter the terrain (even or uneven) to reach a certain desired height, as input by the user prior to setup (or input as a one-time parameter for a particular ladder). While running the setup routine, the smart safety software identifies the center of gravity and also checks the weight distribution of the ladder. Specifically, the smart safety software (onboard computing device) computes the center of gravity for the ladder. Upon computing the center of gravity, the setup moves on to the weight distribution determinations, described below. However, if the center of gravity is changing during use by a user climbing the ladder, then the smart safety software sends the center of gravity data to the user's smartphone mobile app for display on the screen of the user's mobile device. This is done in real-time, thereby ensuring that the user is always able to ascertain the center of gravity of the ladder, even as the user climbs up or down the ladder steps, or shifts weight to one side of the ladder or the other. As one can imagine, too much shifting from side to side may lead to tilting or increasing the risk of the ladder falling. Such continuous, real-time monitoring enhances safety in ways that cannot be expressed in even the most detailed safe usage guidelines of ladder manufacturers.

Similar to determining center of gravity, the smart safety software receives sensor data that allows for weight distribution comparisons between each and all of the legs, as well as the top platform of the ladder. This is all based on the center of gravity for the ladder. In this way, the setup routine is able to ensure that the weight of the ladder is evenly distributed between all of the legs of the ladder. Details of the setup process for the smart safety ladder are described further below, by reference to FIG. 6.

Additionally, the smart safety software is configured to check for ladder tilt during use. When tilting of the ladder is detected, the smart safety software is configured to notify the user (by sending a notification to the smartphone mobile app of the user) of the detected tilt. In this way, the smart safety software is able to ensure that there is no tilt, subject to the maximum possible size of the legs of the ladder.

In addition to performing continuous, real-time computation and monitoring of center of gravity on the ladder and weight distribution computations, the smart safety software is configured to calculate a safe usage perimeter around the user on the ladder and send the calculated safe usage perimeter data to the smartphone mobile app for display on the screen of the user's mobile device. The display of the safe usage perimeter (which is also referred to as the "safe zone", "safety zone", etc., and referred to inversely as the "unsafe zone" when outside of the safe zone or extended beyond the safe usage perimeter) demarcates the area around the ladder (and with respect to the user on the ladder) for safe usage. Assuming the user is on the steps of the ladder (and not hanging off one side/leg or another), the advantage of providing the safe usage perimeter as visual output on the user's smartphone comes when, for instance, the user is reaching out beyond the perimeter. In that scenario, the weight distribution would change and there would be detectable non-conformity between the center of balance of the ladder and the weight distribution. As such, the smart safety software of the smart safety ladder would detect the unsafe usage conditions and immediately send the notification of improper usage and potential risk of accident/injury. While the example above refers to the user reaching out beyond the safe usage perimeter, the smart safety ladder of the present disclosure is sensitive enough to detect any such movement and would, consequently, alert the user when the conditions are deemed unsafe or when the user is engaging in improper usage of the smart safety ladder (e.g., hanging off one side or another, as assumed not to typically occur as noted above, would immediately flag such usage as improper and unsafe).

An adjustable top platform of the smart safety ladder ensures that the top of the ladder is level with respect to its location. In some embodiments, the smart safety software of the onboard computing device automatically determines whether it is level and, when not level, directs an internal motor to adjust the horizontal leveling of the top platform until it is level, with respect to its location. In this way, a user can safely place tools and other items on the adjustable top platform without risk of the items falling off.

The smart safety ladder of the present disclosure may be comprised of the following elements. This list of possible constituent elements is intended to be exemplary only and it is not intended that this list be used to limit the smart safety ladder of the present application to just these elements. Persons having ordinary skill in the art relevant to the present disclosure may understand there to be equivalent elements that may be substituted within the present disclosure without changing the essential function or operation of the smart safety ladder.

1. Onboard computing device (e.g., a single board computer (SBC), such as a Raspberry Pi, an Arduino Nano, or another SBC)
2. Weight sensors (for all the legs and steps of the ladder)
3. Gyroscopes (for all the legs)
4. Actuators and motors (also referred to as "actuator/motor assemblies" for all the legs and the top platform)
5. Battery packs (to power the electronic components)
6. A ladder with a hollow frame
7. Temperature monitor (sensor)
8. Smart device with smart safety mobile app installed The smart safety ladder of the present disclosure generally works by incorporation of the components into the ladder frame and according to their individual functional capabilities (and combined/cascading functional capabilities) of those components. This is described in detail, next. Specifically, the ladder frame itself can be a frame of a typical ladder, such as a small step ladder used in homes, a medium-sized ladder used in homes and outdoors, or a large-reach ladder generally used at construction sites. The additional components of the smart safety ladder are either embedded into the ladder frame or are externally attached to the smart safety ladder (e.g., snapped to the ladder frame).

Several of the components of the smart safety ladder are electronic components. Among the electronic components of the smart safety ladder is a plurality of weight sensors, a plurality of gyroscopes, a plurality of battery packs, an onboard computing device, a data communication system on chip (SoC) that is integrated in a circuit board of the onboard computing device and is configured for wired and wireless data transmission and reception, a temperature monitor (sensor) integrated into the circuit board of the onboard computing device, and a plurality of actuator and motor assemblies. A smart safety mobile app is designed to provide a human interface for smart safety ladder functioning by connecting to the smart safety software application running on the onboard computing device. When the smart safety mobile app is installed on a user's mobile device (such as, without limitation, a smartphone, a tablet computing device, etc.) and connected to the smart safety software running on the onboard computing device, the user is able to interact with the smart safety ladder and receives notifications, alerts, and other visual output pertaining to the functioning of the smart safety ladder.

In some embodiments, the plurality of weight sensors comprise four leg weight sensors (one for each ladder leg), a weight sensor for each step of the ladder, and a weight sensor for the top platform of the ladder. Each weight sensor is configured to send, to the onboard computing device, the weight applied at each of the legs and on the steps/platform of the ladder.

In some embodiments, the plurality of gyroscopes comprise four leg gyroscopes and one platform gyroscope. In some embodiments, each leg gyroscope is embedded within the frame of a leg of the ladder. In some embodiments, the platform gyroscope is embedded within the top platform motor assembly. In some embodiments, the plurality of gyroscopes are configured to sense the tilt of each leg or the top platform. The leg gyroscopes send the tilt data to the onboard computing device, which provides the tilt data for the legs to the smart safety software to compute an angle between a "working" side of the smart safety ladder and a "non-working" side of the ladder (e.g., the working side being the side intended for a user to climb up and down the steps). The platform gyroscope also sends its tilt data to the onboard computing device, which provides the tilt data to the smart safety software to determine whether the top platform is level or not. When the top platform is not level, the smart safety software computes an angle of correction to level the top platform.

In some embodiments, the plurality of battery packs provide electric power to the onboard computing device and the other electronic components of the smart safety ladder. In some embodiments, a battery pack is embedded within each leg of the ladder.

In some embodiments, the onboard computing device comprises a single board computer (SBC). In some embodiments, the onboard computing device comprises a Raspberry Pi SBC. In some embodiments, the smart safety software is installed on the onboard computing device and configured to operate before and during usage of the ladder. In some embodiments, the data from the weight sensors and the gyroscopes are evaluated by the smart safety software running on the onboard computing device and based on results of the evaluation, used by the onboard computing device and smart safety software to determine the center of gravity of the ladder in a present setup (position, arrangement, and physical configuration). In some embodiments, the smart safety software running on the onboard computing device continuously evaluates data received from the gyroscopes in real-time, with or without the user on the ladder.

In some embodiments, the data communication SoC is configured to wirelessly transmit relevant ladder data to the mobile device of the user so that the smart safety mobile app can display relevant safety alerts, notifications, and other data, as well as visually output imagery pertaining to proper ladder usage practices.

In some embodiments, the temperature monitor (sensor) is configured to detect ambient (air) temperature and trigger a notification and alert when temperature exceeds a maximum temperature for safe operation of the onboard computing device, the battery packs, the ladder frame, and the other components of the smart safety ladder.

In some embodiments, the plurality of actuator and motor assemblies comprise four leg actuator and motor assemblies and one platform actuator and motor assembly. In some embodiments, each leg actuator and motor assembly is embedded within the frame of a ladder leg and configured to automate leg extension and retraction to level the smart safety ladder when positioned on an uneven surface. In some embodiments, the platform actuator and motor assembly is configured to automate movement of the top platform into a level orientation (e.g., horizontal, with no slant bias on any side) when the top platform is not level.

In some embodiments, the smart safety mobile app is configured to receive data from the onboard computing device, via wireless connection to the data communication SoC. Based on the received data, the smart safety mobile app outputs alerts and notification and displays renderings on the screen to guide and warn the user when ladder usage does not satisfy the safe usage guidelines for the ladder. In some embodiments, the data exchanged between the smart safety ladder and the smart safety mobile app comprises ladder manufacturer data that is entered once and stored in a smart safety ladder database of the onboard computing device, personal user data that is entered by the user and stored in smart safety mobile app, operation-specific data, limit-specific data, unsafe usage data, and other smart safety ladder data.

In some embodiments, the ladder manufacturer data comprises ladder make and model data, ladder specifications, and a website of the ladder manufacturer, and other contact data of the ladder manufacturer.

In some embodiments, the personal user data are all entered into the smart safety mobile app by the user. The personal user data are entered at one time or at several, disparate times by the user. In some embodiments, the personal data entered by the user comprises a weight of the user and at least one emergency contact (such as a friend, a neighbor, a close family member, a relative, etc.).

In some embodiments, the operation-specific data comprises input data and output data. In some embodiment, the operation-specific input data comprises a desired height of the smart safety ladder input into the smart safety mobile app and stored in the smart safety ladder database. In some embodiments, the operation-specific input data further comprises additional expected weight data (e.g., estimated weight of tools, other objects, etc., expected to be carried onto the ladder) that is input by the user into the smart safety mobile app and stored in the smart safety ladder database. In some embodiments, the operation-specific output data comprises safe/unsafe usage notification and alert output data, smart safety ladder tilt notification and alert output data, smart safety ladder fall notification and alert output data, and incorrect usage output data, such as when the user is climbing from the wrong side (non-working side) of the smart safety ladder.

In some embodiments, the limit-specific data comprises weight limit data that is output when a weight limit for the ladder is exceeded. In some embodiments, the limit-specific data comprises temperature limit data that is output when a temperature limit for the ladder is exceeded.

In some embodiments, the unsafe usage data comprises data output triggered when stable operation of the smart safety ladder is not possible. In some embodiments, the unsafe usage data comprises uneven terrain notification and alert data that is output when placement of the ladder is on uneven terrain. In some embodiments, the unsafe usage data comprises uneven weight distribution notification and alert data that is output when weight distribution on the ladder is uneven.

In some embodiments, the other smart safety ladder data comprises ambient temperature data that triggers an ambient temperature indicator when the temperature sensor detects an ambient (air) temperature that exceeds a maximum temperature for safe operation of the onboard computing device, the battery packs, and the ladder frame. In some embodiments, the other smart safety ladder data further comprises battery charge level data that is visually output as a battery charge status indicator for each battery pack, showing a remaining amount of charge. In addition, the smart safety mobile app is configured to visually output one or more on-screen depictions of proper and improper usage of the smart safety ladder based on data received from the onboard computing device before and during usage by a user of the smart safety ladder.

By way of example, FIG. 1 conceptually illustrates a smart safety ladder 10. As shown in this figure, the smart safety ladder 10 includes a plurality of steps 12 (or "rungs 12"), a plurality of side rail legs 20, a top working platform 28, a pair of front side rail legs 34A (or "working-side legs 34A"), and a pair of rear side rail legs 34B (or "non-working side legs 34B"). In the next example, an uneven terrain position for the smart safety ladder is shown, as described by reference to FIG. 2.

Figure 2:
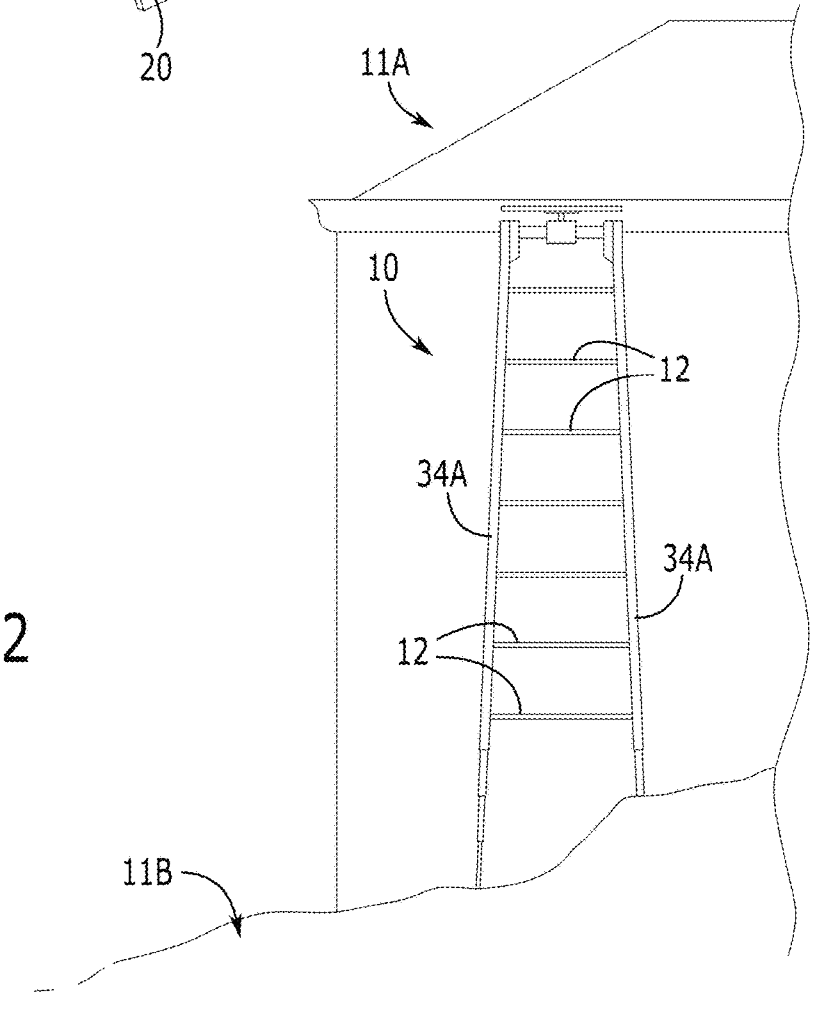
FIG. 2 conceptually illustrates a front elevation view of a smart safety ladder positioned on uneven terrain in some embodiments.

Specifically, FIG. 2 conceptually illustrates the smart safety ladder 10 positioned on uneven terrain 11B. As shown in this view, the uneven terrain 11B is consequential to the setup of the smart safety ladder 10 with the front side rail leg 34A on the left elongated a considerable distance (e.g., three units of extension) and the front side rail leg 34A on the right elongated a lesser distance (e.g., one unit of extension). While not shown in this view, the rear side rail leg 34B on the left and the rear side rail leg 34B on the right would likely be extended similar distances, respectively (but depending on the ground at the respective locations).

Figure 3:
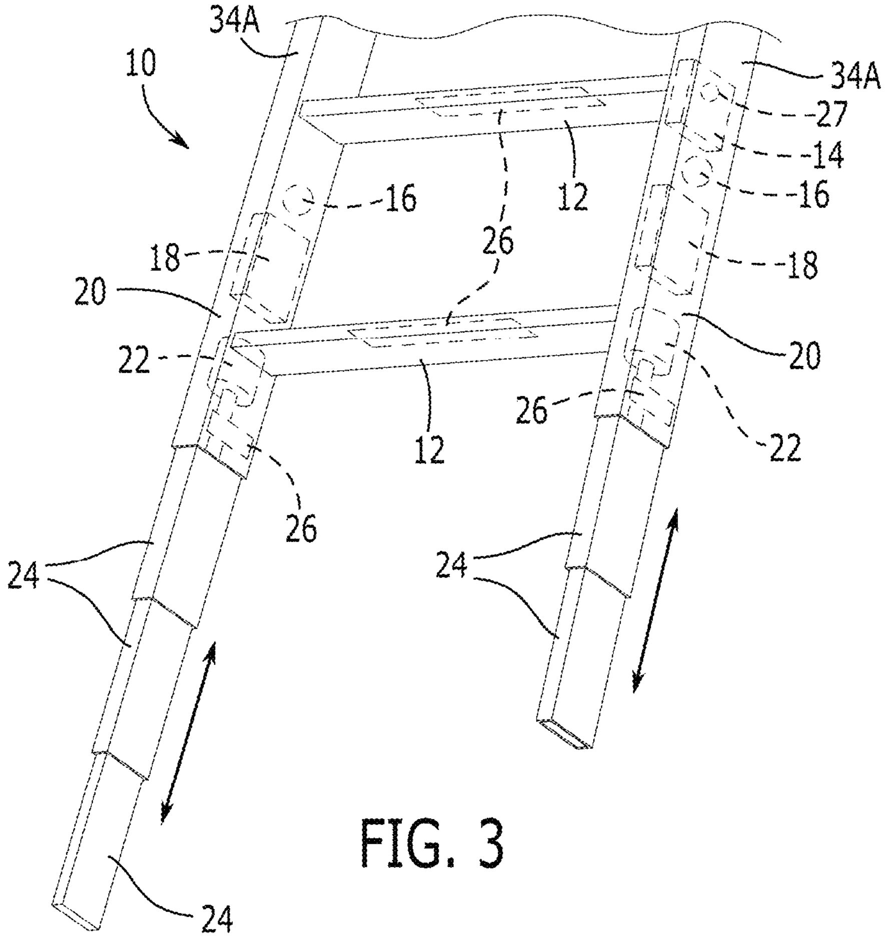
FIG. 3 conceptually illustrates a lower detail perspective view of adjustable legs of a smart safety ladder in some embodiments.

Details of the leg assembly at the bottom of the legs of the smart safety ladder 10 are described next, by reference to FIG. 3. Specifically, FIG. 3 conceptually illustrates a lower detail perspective view of adjustable legs of a smart safety ladder 10. As shown in this figure, the smart safety ladder 10 includes gyroscopes 16, battery packs 18, actuator/motor assemblies 22, and weight sensors 26 embedded within the side rail legs 20 (specifically, the front side rail legs 34A in this example). The weight sensors 26 are disposed at the ends of the side rail legs 20 in order to gauge the weight on each leg 20. Weight sensors 26 are also integrated/embedded into the ladder steps 12. By having the weight sensors 26 present on each step/rung 12 of the smart safety ladder 10, the onboard computing device 14 can determine weight that is supported at each step height. Hydraulic lift supports 24 are shown at the bottom ends of the side rail legs 20. The hydraulic lift supports 24 are configured to extend out (to elongate) and retract inward (to shorten) any given side rail leg 20. In this way, the hydraulic lift supports 24 provide struts lift support and are powered hydraulically or by motor. Alternatively, they could support telescopic function during extension/retraction. Furthermore, the frame of the smart safety ladder 10 can be made of metal (e.g., steel, aluminum, etc.) or wood, or other durable material, so long as the frame is hollowed out and capable of embedding various internal components. Otherwise, the internal components could be (alternatively) snapped to an external surface of the frame of the ladder 10. Furthermore, the onboard computing device 14 with integrated temperature monitor 27 is embedded within one of the front side rail legs 34A.

Figure 4:
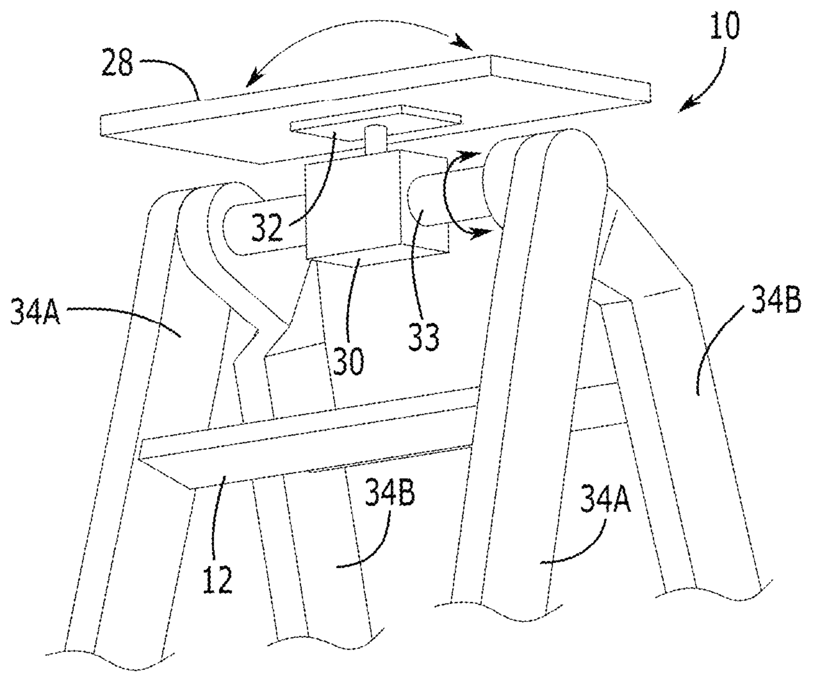
FIG. 4 conceptually illustrates a detailed perspective view of a top platform and top motor assembly of a smart safety ladder in some embodiments.

Similarly, details of the top platform of the smart safety ladder 10 are described by reference to FIG. 4, which conceptually illustrates a detailed perspective view of the top working platform 28 and the top motor assembly 30 of a smart safety ladder 10. As shown in this figure, the top working platform 28 provides a flat platform which can support tools and items needed by the user of the smart safety ladder 10 during use (e.g., a flat surface on which to place a paint and brushes for a painter). Also, the top working platform 28 is capable of three-dimensional angular displacements intended to ensure a level working surface upon setup of the smart safety ladder 10. The top working platform 28 is connected to the top motor assembly 30 via base plate 32. A top bar 33 is connected to the top motor assembly 30. The top bar 33 connects the left and right sides of the smart safety ladder 10, including both (i) the pair of front side rail legs 34A and (ii) the pair of rear side rail legs 34B. The onboard computing device 14 is connected to the top motor assembly 30 by embedded wire connection through the top bar 33. In this way, the top motor assembly 30 can trigger the top platform leveling system to automate the leveling feature of the top working platform 28, such as when the desired height of the smart safety ladder 10 is achieved during setup (which is described in greater detail below, by reference to FIG. 6).

Figure 5:
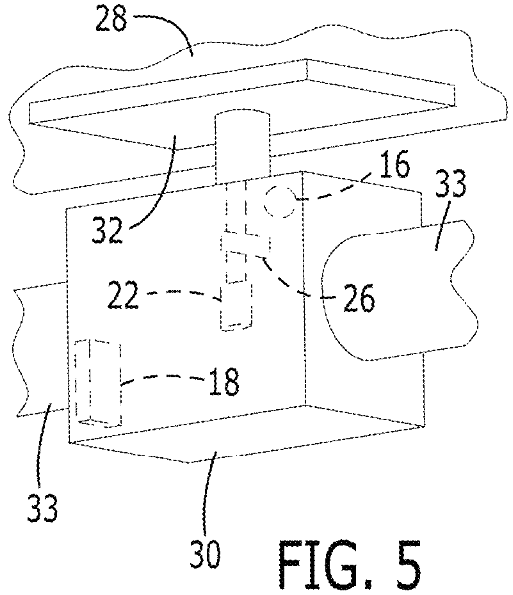
FIG. 5 conceptually illustrates components embedded in the top motor assembly of the smart safety ladder in some embodiments.

In particular, the motor assembly 30 shown in FIG. 4 includes several embedded components, which are demonstrated in FIG. 5, described next. Specifically, FIG. 5 conceptually illustrates components embedded in the top motor assembly 30 of the smart safety ladder 10. The components embedded in the top motor assembly 30 include a gyroscope 16, a battery pack 18, an actuator/motor assembly 22, and a weight sensor 26. The top bar 33 extends out from both sides of the top motor assembly 30, to connect with the pair of front side rail legs 34A and the pair of rear side rail legs 34B. The top working platform 28 connects to the base plate 32 and ultimately to the top surface of the top motor assembly 30.

To make the smart safety ladder of the present disclosure, the components described above are controlled by the smart safety software running on the onboard computing device embedded into the ladder frame. The onboard computing device, in turn, is configured with operational parameters as set by the user through the smart safety mobile app. Similarly, the onboard computing device of some embodiments is controlled by the smart safety mobile app when loaded and running on the mobile device of the user (e.g., on the user's smartphone or tablet computing device). Thus, software may be designed, developed, coded, and deployed for use to implement the automation control processes for operation of the smart safety ladder. The ladder frame itself would be manufactured with the physical components embedded inside. Alternatively, the physical components can be attached to the frame of the ladder.

Figure 6:
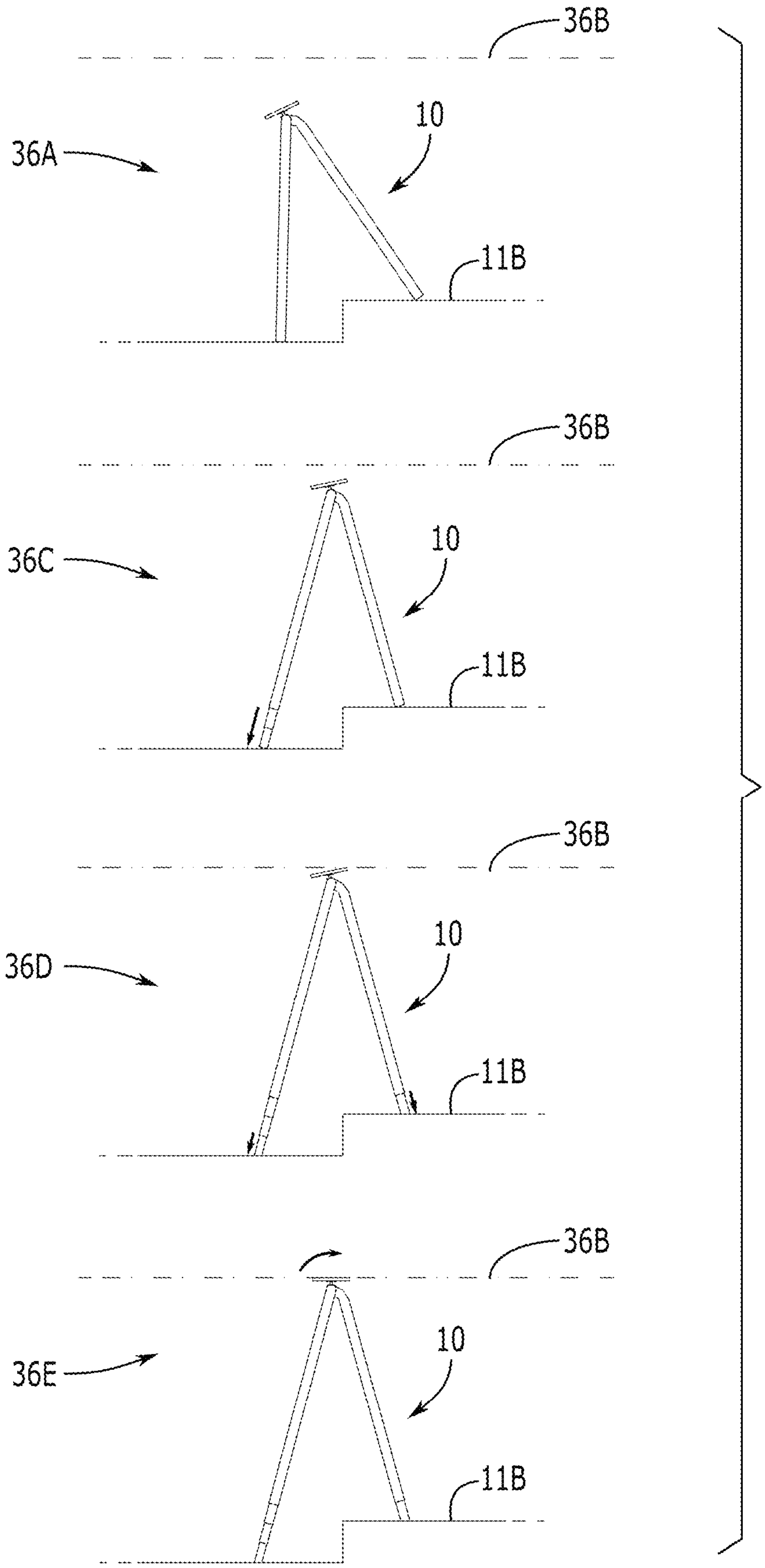
FIG. 6 conceptually illustrates a setup process of a smart safety ladder in some embodiments.

To use the smart safety ladder of the present disclosure, an example is demonstrated and described next, by reference to FIG. 6. Specifically, FIG. 6 conceptually illustrates a smart safety ladder 10 during setup. Ideally, the smart safety ladder 10 will be set up to reach the desired height of 36B. This is demonstrated over four stages, namely, a first setup stage 36A, a second setup stage 36C, a third setup stage 36D, and a fourth setup stage 36E. During the first setup stage 36A, the smart safety ladder 10 is placed on an uneven surface 11B. As shown in the first setup stage 36A, legs on the working side of the ladder 10 are positioned at a lower elevation of the uneven surface 11B than the legs of the non-working side of the ladder 10, which are at a higher elevation. Although not shown in this figure, let us assume that a user is standing towards the working side of the ladder 10. Clearly, climbing the rungs of the ladder 10 would be riskier to the user than if the ladder 10 were set up properly. Also, the top platform of the smart safety ladder 10 is not horizontal to the ground. In this case, the user may power up the onboard computing device of the ladder 10 and set the ladder 10 into a smart mode. The onboard computing device, once powered up, would then power up the sensors (weight sensors and gyroscopes), actuator/motor assemblies, and the adjustable legs. Then the onboard computing device would prompt the user, through the smart safety mobile app, to input the desired height 36B for the top platform of the ladder 10. Furthermore, the onboard computing device would prompt the user, through the smart safety mobile app, to input the weight of the user and the additional weight expected (e.g., tools, object, etc.).

With the data input completed by the user, the onboard computing device then reads in the data from the sensors and performs computations. Thus, the onboard computing device of the ladder 10 makes several computational determinations, namely, (i) the weight applied to each of the four legs of the ladder 10, (ii) the angle of the working side and non-working side of the ladder 10 to the ground, and (iii) any additional weight on the ladder 10 in excess of the already known/stored ladder weight data (and alerts the user to make sure there is no additional weight on the ladder 10 at this point). With these preliminary computations and determinations, the onboard computing device of the ladder 10 then identifies the center of gravity of the ladder 10. Next, the onboard computing device of the ladder 10 determines whether the center of gravity of the ladder 10 is within a safe zone or not. When the center of gravity of the ladder 10 is within the safe zone, the onboard computing device of the ladder 10 determines whether a safer operating condition can be achieved compared to the current operating condition of the smart safety ladder 10. For instance, the ladder 10 is placed on uneven terrain 11B, so a safer operating condition is possible by adjusting some of the legs of the ladder 10. Thus, the onboard computing device of the ladder 10 determines what the length of each leg should be for stable operation of the ladder 10.

Thus, the onboard computing device of the ladder 10 triggers the actuator/motor assemblies of the associated legs to extend the length of the working-side legs of the ladder 10, which is shown in the second setup stage 36C. As shown, the working-side legs of the ladder 10 are gradually elongated. This is done to meet two objectives, namely, (i) that the center of gravity is at the lowest possible given the desired height 36B of the top platform and (ii) that the top platform reaches the desired height 36B of the ladder 10 as stored in the database. While the second setup stage 36C demonstrates the automated manner in which the legs can be extended to reach a more stable, upright position for the ladder 10, not all of the automation is performed only by the working-side legs. In some cases, the non-working side legs also perform certain automated functions, which is described next.

Specifically, turning to the third setup stage 36D, the working-side legs of the ladder 10 have been extended out by a certain amount (e.g., three units of elongation). Also, the non-working side legs have been extended out, to a lesser degree (e.g., one unit of elongation) than elongation of the working-side legs, but in a way that elevates a portion (an edge) of the top platform of the ladder 10 to the desired height 36B. Note that the entire top platform of the ladder 10 is not at the desired height 36B—only a single edge of the top platform is at the desired height 36B during this third setup stage 36D. However, by ensuring that at least one edge of the top platform is at the desired height 36B, the onboard computing device is able to conclude the leg adjustments are no longer needed to reach the desired height 36B. Instead, the only thing left is to automatically adjust the top platform of the ladder 10 to be level.

This is shown in the fourth setup stage 36E where the top platform is adjusted to be horizontal to the ground. After leveling out the top platform of the ladder 10 during the fourth setup stage 36E, the onboard computing device of the ladder 10 transmits a notification to the smart safety mobile app, running on the user's mobile device, which signals the user that it is safe to start using (e.g., climbing) the ladder 10. While the user is climbing the ladder 10, the onboard computing device is configured to continuously determine weight distribution based on the weight sensor data. That is, the onboard computing device recomputes the weight distribution (for the four legs) and the center of gravity for each movement of the user, each step up the ladder 10 by the user, and each lateral shift in weight made by the user (e.g., a shift from one side of the ladder 10 to another side of the ladder 10, but perhaps with the user on the same steps prior to and after the shift in weight). All of the calculations and sensor data analysis is performed in real-time. In this way, the onboard computing device can immediately send an alert to the user's mobile device whenever the center of gravity is determined to be in the unsafe zone.

Furthermore, the smart safety mobile app is configured to visually output all notification data, alert data, and other data, including renderings of a safe zone visual element, a conceptual ladder element, and the relative positioning of the safe/unsafe zone visual element with respect to the ladder visual element. Being able to visualize the safe zone on the mobile device ensures that the user can quickly make adjustments as needed to use the ladder 10 in a more suitable and safer manner. Examples of visual output for the smart safety mobile app are described below, by reference to FIGS. 8-10. However, the block diagram of the internal components of the smart safety ladder is described next, by reference to FIG. 7.

Figure 7:
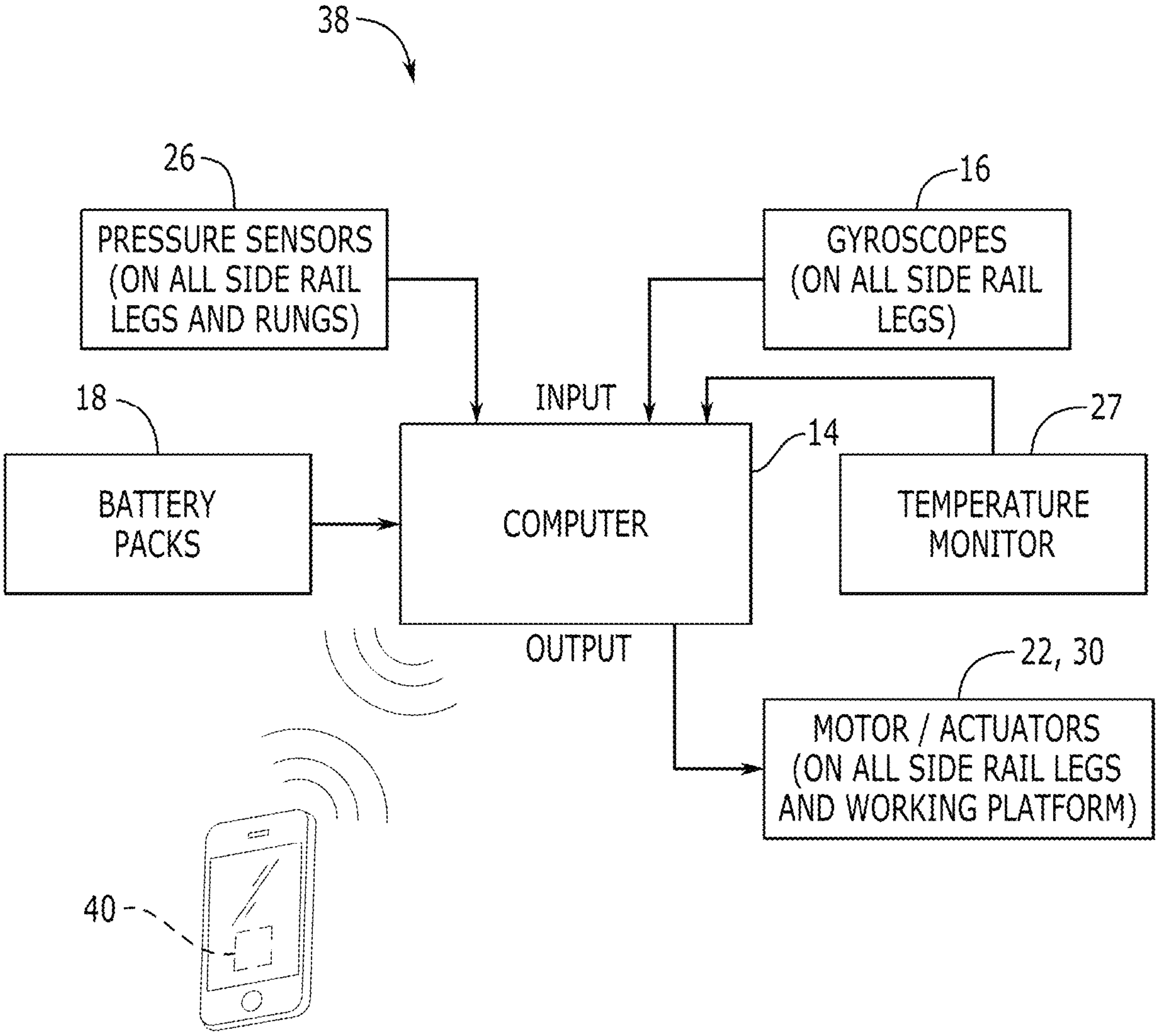
FIG. 7 conceptually illustrates internal components of a smart safety ladder of some embodiments including an onboard computing device, sensors, and actuator/motor assemblies embedded in a frame of a smart safety ladder in some embodiments and a mobile device that is configured to exchange data in real-time with the onboard computing device.

Specifically, FIG. 7 conceptually illustrates several internal components of a smart safety ladder 38, including an onboard computing device 14, a plurality of sensors, a plurality of actuator/motor assemblies 22 and a top motor assembly 30, and a plurality of battery packs 18. As shown in this figure, the plurality of sensors of the smart safety ladder 38 include a plurality of pressure (or weight) sensors 26, a plurality of gyroscopes 16, and a temperature monitor 27. The plurality of pressure (weight) sensors 26 are positioned internally within the frame of the ladder on all side rail legs and all steps/rungs of the ladder, with at least one pressure (weight) sensor embedded in the top motor assembly 30. The plurality of gyroscopes 16 are embedded in the frame along all side rail legs of the ladder with at least one gyroscope 16 embedded in the top motor assembly 30. The temperature monitor 27 is incorporated into the onboard computing device 14 in some embodiments. In some embodiments, the temperature monitor 27 is externally connected to the onboard computing device 14 being embedded within the frame of the ladder at another position. The plurality of actuator/motor assemblies 22 are embedded within the frame of the ladder along the lower side rail legs and are configured to extend and retract the legs individually. The top motor assembly 30 is positioned directly below the top working platform 28, as connected by a base plate 32. Another actuator/motor assembly 22 is embedded within the top motor assembly 30 and configured to automate movement of the top platform in three dimensions. The plurality of battery packs 18 are embedded within the frame of the ladder along all of the side rail legs and with one battery pack 18 embedded in the top motor assembly 30 to provide power for the internal components therein.

While the internal components of the smart safety ladder 38 are described as being embedded in the frame of a smart safety ladder, it is possible to create the smart safety ladder in a way that externally disposes one or more of the sensors or battery packs and still maintain similar or the same functionality.

In contrast to the preferably embedded internal components of the smart safety ladder, the mobile device with a smart safety mobile app 40 is communicably connected (via wireless communication) to the onboard computing device 14 from an external location (with a user).

General functioning involves the pressure (weight) sensors 26, the gyroscopes 16, and the temperature monitor 27 providing sensor data as input into the onboard computing device 14. The onboard computing device 14 analyzes the data and generates output data involving determinations as to how best to adjust the setup of the smart safety ladder and/or to provide notifications or alerts and other visual data to the mobile device and smart safety mobile app 40 for user viewing. Furthermore, the onboard computing device 14 is configured to trigger actuation of the actuator/motor assemblies 22 to adjust leg length as needed and/or level the top platform.

The mobile device and smart safety mobile app 40, for its part, is not merely a passive receiver of data from the onboard computing device 14. Specifically, the mobile device and smart safety mobile app 40 is configured to exchange data in real-time with the onboard computing device 14 when the user inputs various information (e.g., user weight, expected add-on weight, manufacturer's information, etc.) and also when the onboard computing device 14 sends its data after analyzing the sensor data from the pressure (or weight) sensors 26 (which are on all side rail legs of the ladder, the steps/rungs of the ladder, and in the top motor assembly 30 of the ladder), the gyroscopes 16 (which are on all side rail legs of the ladder and in the top motor assembly 30 of the ladder), and the temperature monitor 27 of the ladder.

Figure 8:
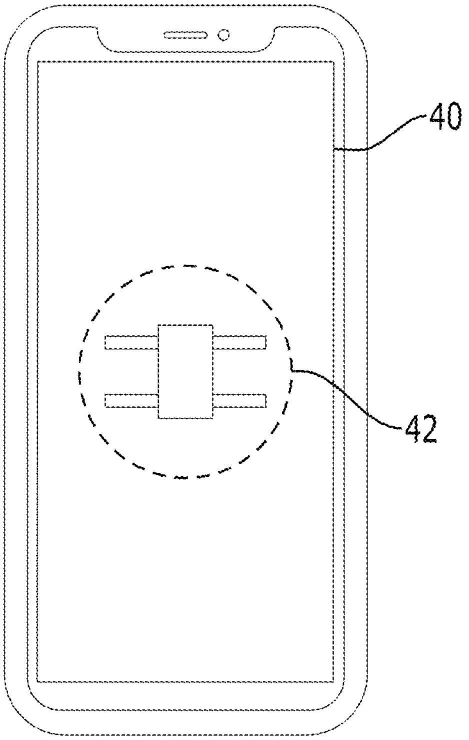
FIG. 8 conceptually illustrates a first view of a smart safety mobile app that runs on the mobile device in some embodiments.

Now, turning to the examples of visual output for the smart safety mobile app, FIG. 8 conceptually illustrates a first view of a smart safety mobile app 40 that runs on the mobile device. Specifically, the first view of the smart safety mobile app 40 demonstrates a safe zone 42 around a ladder element.

Figure 9:
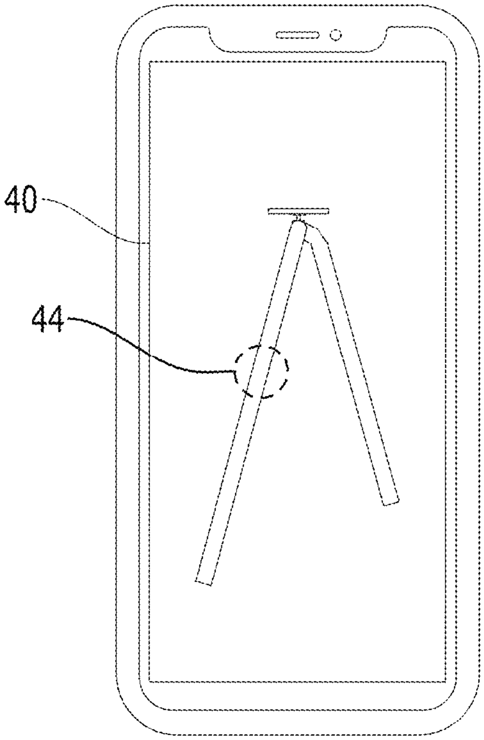
FIG. 9 conceptually illustrates a second view of the smart safety mobile app that runs on the mobile device in some embodiments.

In another view of the smart safety mobile app, FIG. 9 conceptually illustrates a second view of the smart safety mobile app 40 that runs on the mobile device. In this case, the center of gravity 44 for the ladder is identified and visually output for the user to see.

Figure 10:
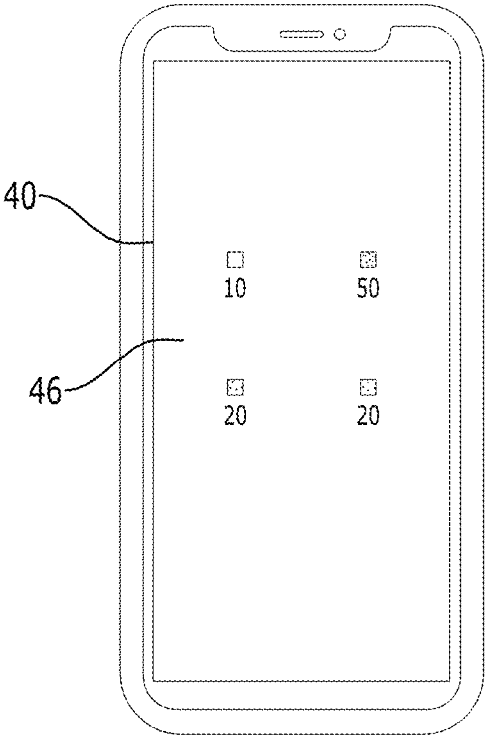
FIG. 10 conceptually illustrates a third view of the smart safety mobile app that runs on the mobile device in some embodiments.

Another exemplary view of the smart safety mobile app is shown in FIG. 10, which conceptually illustrates a third view of the smart safety mobile app 40 that runs on the mobile device. In this view, the four legs of the ladder are shown with weight distribution data 46 noted. Specifically, in this example, a first leg (appearing top-left) has a ten percent (10%) weight distribution, a second leg (appearing top-right) has a fifty percent (50%) weight distribution, a third leg (appearing bottom-left) has a twenty percent (20%) weight distribution, and a fourth leg (appearing bottom-right) has a twenty percent (20%) weight distribution. Combined together, the weight distribution sums to a full one-hundred percent.

The above-described embodiments of the invention are presented for purposes of illustration and not of limitation. In addition to the many details and examples described above, by reference to FIGS. 1-10, the smart safety ladder of the present disclosure can be adapted for use as another type of safe device where weight distribution is used as input and appropriate action is taken to either alert the user or a mitigation/adjustment scheme is employed to correct the weight distribution for safe operation of a machine, toy, object etc. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

Many of the above-described smart ladder safety features and smart safety applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
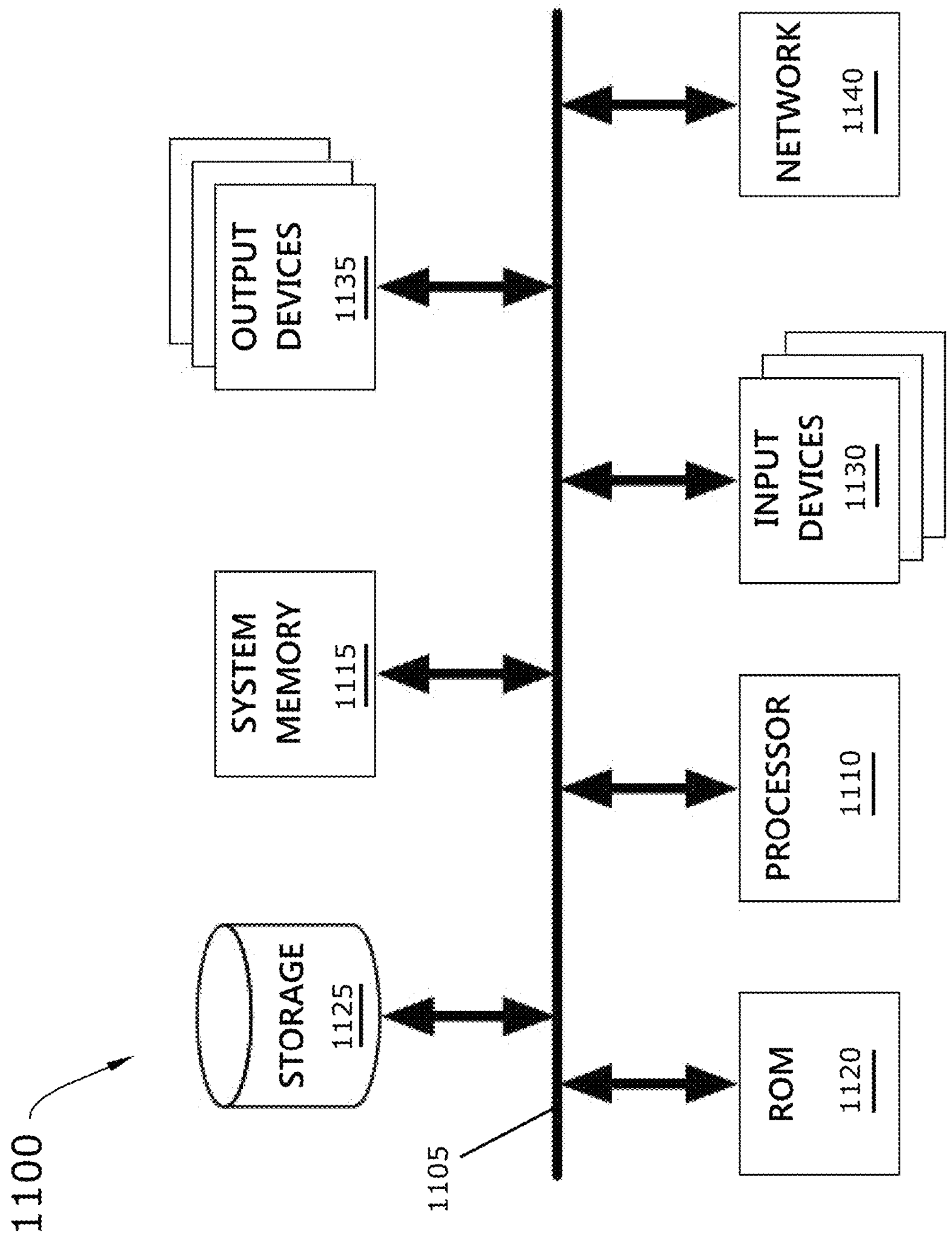
FIG. 11 conceptually illustrates an electronic system with which some embodiments of the invention are implemented.

By way of example, FIG. 11 conceptually illustrates an electronic system 1100 with which some embodiments of the invention are implemented. The electronic system 1100 may be a computer (such as the onboard computing device 14, which may be in the form of a single board computer (SBC), such as a Raspberry Pi SBC), a mobile device (such as the mobile device on which the smart safety mobile app 40 is installed, and which may be any kind of mobile device including, without limitation, a cell phone, a mobile phone, a smartphone, a tablet computing device, etc.), or any other sort of electronic device or computing device. Such an electronic system includes various types of computer readable media and interfaces for various other types of computer readable media. Electronic system 1100 includes a bus 1105, processing unit(s) 1110, a system memory 1115, a read-only memory 1120, a permanent storage device 1125, input devices 1130, output devices 1135, and a network 1140.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1120, the system memory 1115, and the permanent storage device 1125. The bus 1105 may support one or more bus communication standards such as, asynchronous serial communications over a Universal Asynchronous Receiver-Transmitter (UART) bus or a synchronous, multi-controller/multi-target, single-ended, serial communications over an Inter-Integrated Circuit ($I^2C$) bus.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1120 stores static data and instructions that are needed by the processing unit(s) 1110 and other modules of the electronic system. The permanent storage device 1125, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1125.

Other embodiments use a removable storage device (such as a flash drive) as the permanent storage device 1125. Like the permanent storage device 1125, the system memory 1115 is a read-and-write memory device. However, unlike storage device 1125, the system memory 1115 is a volatile read-and-write memory, such as a random access memory. The system memory 1115 stores some of the instructions and data that the processor needs at runtime. In some embodiments, the invention's processes are stored in the system memory 1115, the permanent storage device 1125, and/or the read-only memory 1120. For example, the various memory units include instructions for analyzing sensor data before and during usage of the smart safety ladder, and outputting commands to actuators and motors and wirelessly transmitting information to a connected mobile device with the smart safety mobile app installed. From these various memory units, the processing unit(s) 1110 retrieves instructions to execute and data to process in order to execute the processes of some embodiments.

The bus 1105 also connects to the input and output devices 1130 and 1135. The input devices provide sensor data in real-time for the smart safety ladder, which is communicated to the electronic system (i.e., to the onboard computing device). The input devices 1130 include weight sensors, gyroscopes, temperature sensors, etc. The output devices 1135 include actuators and motors, extendable side rail legs, the leveling system, etc. Furthermore, the output devices 1135 may display images generated by the electronic system 1100 in some embodiments. For example, the output devices 1135 may include display devices, such as liquid crystal displays (LCD) and organic light emitting diode (OLED) displays which integrated into the outer ladder frame (e.g., along a side rail) and are communicably connected to the onboard computing device embedded within the smart safety ladder. Although not described in reference to FIGS. 1-10, a person of ordinary skill in the art would appreciate the many ways in which such output devices could be connected to the onboard computing device to enhance visual output, perform internal quality testing, trouble-shoot or replace/text problematic sensors, etc.

Finally, as shown in FIG. 11, bus 1105 also couples electronic system 1100 to a network 1140 through a network adapter (not shown). In this manner, the onboard computing device (and, therefore, the smart safety ladder) can be an Internet of Things (IoT) node of a network of computers/IoT nodes or other devices, for any type of network (such as a local area network ("LAN"), a wide area network ("WAN"), or an intranet), or a network of networks (such as the Internet).

Any or all components of electronic system 1100 may be used in conjunction with the invention. The functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 6 conceptually illustrates a smart safety ladder setup process in which the specific operations of the setup process may not be performed in the exact order shown and described, and the terrain in which the setup occurs may vary considerably. Specific operations may not be performed in one continuous series of operations, and different specific operations may be performed in different embodiments. Furthermore, the smart safety ladder setup process could be implemented using several sub-processes, or as part of a larger macro process. Thus, one of ordinary skill in the art would understand that the invention is not to be limited by the foregoing illustrative details, but rather is to be defined by the appended claims.

I claim:

1. A smart safety ladder comprising:

a hollow frame of the ladder comprising four side rail legs;

a plurality of weight sensors embedded within the frame of the ladder;

a plurality of gyroscopes embedded within the frame of the ladder;

a plurality of actuators embedded within the side rail legs of the ladder;

a plurality of steps that connect across pairs of the side rail legs;

a temperature monitor embedded within the frame of the ladder;

an onboard computing device embedded within the frame of the ladder, wherein the onboard computing device comprises a smart safety software application that is configured to receive and analyze sensor data received from the weight sensors, the gyroscopes, and the temperature monitor, wherein the smart safety software application of the onboard computing device is further configured to determine a center of gravity of the ladder and weight distribution along each side rail leg of the four side rail legs; and a plurality of battery packs embedded within the frame of the ladder and configured to provide power to the onboard computing device, the weight sensors, the gyroscopes, the actuators, and the temperature monitor.

2. The smart safety ladder of claim 1, wherein the side rail legs are adjustable in length.

3. The smart safety ladder of claim 1, wherein the onboard computing device comprises a single board computer (SBC).

4. The smart safety ladder of claim 3, wherein the SBC comprises a Raspberry Pi computing device.

5. A smart safety ladder comprising:

a hollow frame of the ladder comprising four side rail legs;

a plurality of weight sensors embedded within the frame of the ladder;

a plurality of gyroscopes embedded within the frame of the ladder;

a plurality of actuators embedded within the side rail legs of the ladder;

a plurality of steps that connect across pairs of the side rail legs;

a temperature monitor embedded within the frame of the ladder;

an onboard computing device embedded within the frame of the ladder, wherein the onboard computing device is configured to output notification data, alert data, and visual data to a mobile device operable by a user of the ladder, wherein the mobile device comprises a smart safety mobile app that is configured to receive the notification data, alert data, and visual data from the onboard computing device and display, in real-time, notifications, alerts, a ladder graphical element, a center of gravity graphical element along the ladder graphical element, and a safe zone graphical element around the ladder graphical element; and a plurality of battery packs embedded within the frame of the ladder and configured to provide power to the onboard computing device, the weight sensors, the gyroscopes, the actuators, and the temperature monitor.

6. The smart safety ladder of claim 5, wherein the side rail legs are adjustable in length.

7. The smart safety ladder of claim 5, wherein the onboard computing device comprises a single board computer (SBC).

8. The smart safety ladder of claim 7, wherein the SBC comprises a Raspberry Pi computing device.

* * * * *